United States Patent [19]

Orlowski et al.

[11] Patent Number: 5,306,086
[45] Date of Patent: Apr. 26, 1994

[54] SPRING ASSEMBLY WITH INTERCONNECTING ANNULAR PLATES

[75] Inventors: Henry Orlowski, Coldwater; Richard Margaritondo, Howell, both of Mich.

[73] Assignee: Kuhlman Corporation, Lexington, Ky.

[21] Appl. No.: 968,535

[22] Filed: Oct. 29, 1992

[51] Int. Cl.⁵ .............................. F16F 3/00; F16F 1/06
[52] U.S. Cl. ........................ 267/89; 267/174; 267/179; 192/89 R
[58] Field of Search ................ 267/89, 91, 167, 170, 267/174, 179; 192/89 CP, 89 R, 70.27

[56] References Cited

U.S. PATENT DOCUMENTS

| | | | |
|---|---|---|---|
| 2,104,962 | 1/1938 | Anderson | 192/89 CP X |
| 2,436,874 | 3/1948 | Spase | 192/70.27 X |
| 3,489,255 | 1/1970 | Gatewood | 192/89 CP |
| 3,587,802 | 6/1971 | Pink | 192/89 CP |
| 3,782,708 | 1/1974 | Dulude et al. | 267/179 X |
| 4,756,070 | 7/1988 | Takeuchi | 267/179 X |
| 4,756,071 | 7/1988 | Takeuchi | 267/179 X |
| 4,905,574 | 3/1990 | Trevisan | 267/170 X |

FOREIGN PATENT DOCUMENTS 1-93414  8/1989  Japan ................ 192/89 R

OTHER PUBLICATIONS

Kuhlman Corporation, TRANS-PAK Spring Assembly Division, 1991, 4-page brochure.
TRANS-PAK Spring Assembly Division, Kuhlman Corp., Drawing entitled "Reverse Input Return Spring", Part No. 102951, Apr. 1991.

*Primary Examiner*—Robert J. Oberleitner
*Assistant Examiner*—Kevin D. Rutherford
*Attorney, Agent, or Firm*—Harness, Dickey & Pierce

[57] ABSTRACT

A spring assembly particularly adapted for use in vehicular automatic transmissions comprising a pair of annular plates having a multiplicity of circumferentially spaced, parallel-oriented compression springs mounted therebetween. The annular plates are interconnected at circumferentially spaced points around their periphery so that the compression springs are held in a precompressed state. The interconnection means are designed so as to permit the overall axial length of the spring assembly to constrict as the springs are compressed. Two alternative embodiments of the present invention are disclosed: a first embodiment wherein the annular plates are made from stamped sheet metal and a second embodiment wherein the annular plates are made from injected molded plastic.

30 Claims, 2 Drawing Sheets

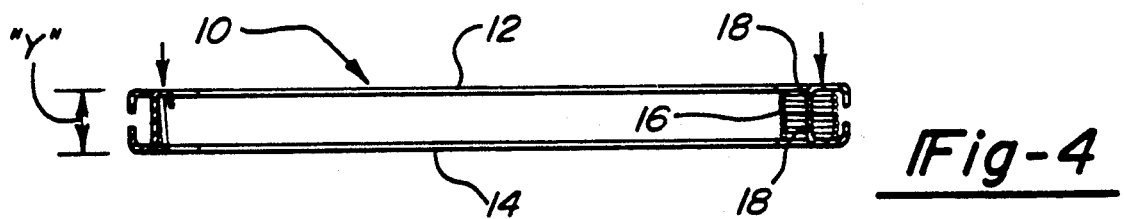
Fig-4
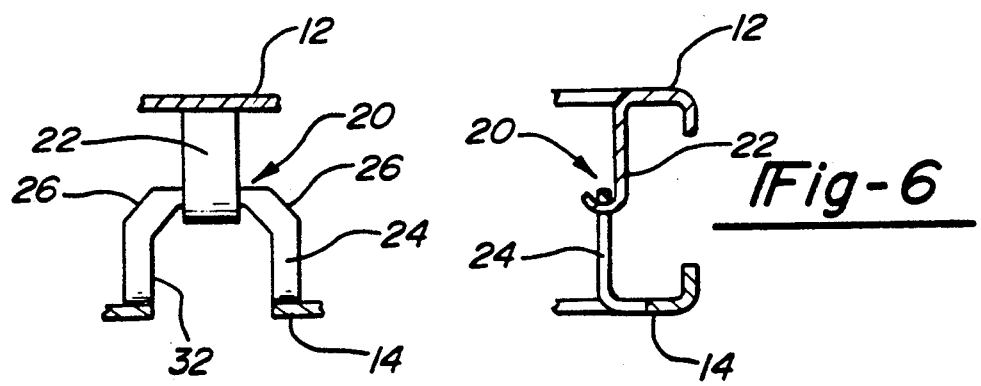
Fig-5
Fig-6
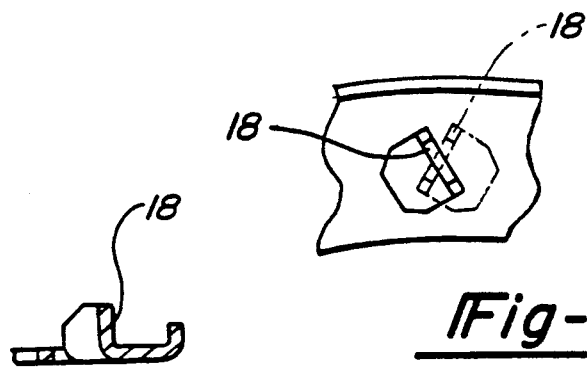
Fig-7
Fig-8

SPRING ASSEMBLY WITH INTERCONNECTING ANNULAR PLATES

BACKGROUND AND SUMMARY OF THE INVENTION

The present invention relates to spring assemblies and, in particular, to spring assemblies adapted for use in automatic transmissions for vehicles.

Automatic transmissions for vehicles often include a plurality of spring assemblies that are adapted to apply, typically via a die-cast piston member, biasing force against clutch plate assemblies that control the engagement of the various gears in the transmission. These spring assemblies generally comprise an annular plate having a multiplicity of circumferentially spaced, parallel-oriented compression springs mounted thereto. Alternatively, the spring assembly may include a second annular plate secured to the opposite free ends of the compression springs as well. Spring assemblies of the above-described type are disclosed in U.S. Pat. No. 3,782,708.

With the advent of automatic transmissions having four, five, and even six forward gears, coupled with the need to package these transmissions in smaller overall volumes, there is a desire among automobile manufacturers to reduce the axial length of the spring assemblies while at the same time increasing the axial force of the spring assemblies without increasing the spring rate. Keeping the spring rate of the assemblies as low as possible is desirable because it helps to achieve smooth shifts.

To achieve the goals of increased force while maintaining the same spring rate dictates the use of taller compression springs. However, the use of taller compression springs also serves to correspondingly increase the axial length of the resulting spring assembly. Moreover, since the spring assemblies are typically compressed and released during assembly of an automatic transmission, the increased excursion of the spring assembly can result in damage to the seals in the transmission.

Accordingly, it is the primary object of the present invention to provide an improved spring assembly that is shorter in axial length, provides greater axial force, and yet maintains the same spring rate of conventional spring assemblies. In addition, it is also an object of the present invention to provide a spring assembly that satisfies these criteria in a reliable and cost-effective manner.

In general, the present invention accomplishes these objectives by providing taller compression springs that are precompressed between two annular plates that are interconnected at circumferentially spaced points around their peripheries. In this manner, the axial length of the overall spring assembly is controlled despite the use of taller compression springs. Moreover, the interconnection means between the two annular plates is configured so as not to restrict the compressibility of the spring assembly and thereby enable the axial length of the entire spring assembly to constrict a the springs are compressed. In other words, the axial length of the entire spring assembly according to the present invention is compressible to the same extent as a conventional spring assembly without the interconnection means. However, unlike a conventional spring assembly, the interconnection means in the present invention prevent the springs from reaching their complete free-state length and thereby controls the packaging size of the spring assembly. In the preferred embodiment of the present invention, the interconnection means is designed to limit the axial length of the spring assembly to a height slightly greater than the maximum excursion height of the spring assembly during normal operation of the transmission so that the interconnection means remains unloaded during normal operation, thereby improving reliability.

In addition, the annular plates in the preferred embodiment are formed with specially configured upstanding tabs for mounting the compression springs to the plates. In particular, the tabs are formed to a predetermined height and are oriented so that the opposed tabs on the two annular plates supporting the respective ends of each compression spring will abut one another as the springs are about to become fully compressed, thereby preventing possible overstressing or distortion of a spring, or distortion of the interconnection means.

Further, the interconnection means which are integrally formed on the annular plates are preferably designed so that the two annular plates are identical in configuration and can therefore be manufactured from the same tooling to save costs.

Additional objects and advantages of the present invention will become apparent from a reading of the following detailed description of the preferred embodiment which makes reference to the drawings of which:

BRIEF DESCRIPTION OF THE DRAWINGS

FIG. 4 is a section view of the spring assembly as shown in FIG. 3 in is fully compressed state;

FIG. 5 is an enlarged plan view of the interconnecting means;

FIG. 6 is an enlarged side view of the interconnecting means;

FIG. 7 is an enlarged detail view of the support tabs with the springs removed for clarity; and FIG. 8 is an enlarged sectional view of a support tab.

DETAILED DESCRIPTION OF THE PREFERRED EMBODIMENT

Figure 2:
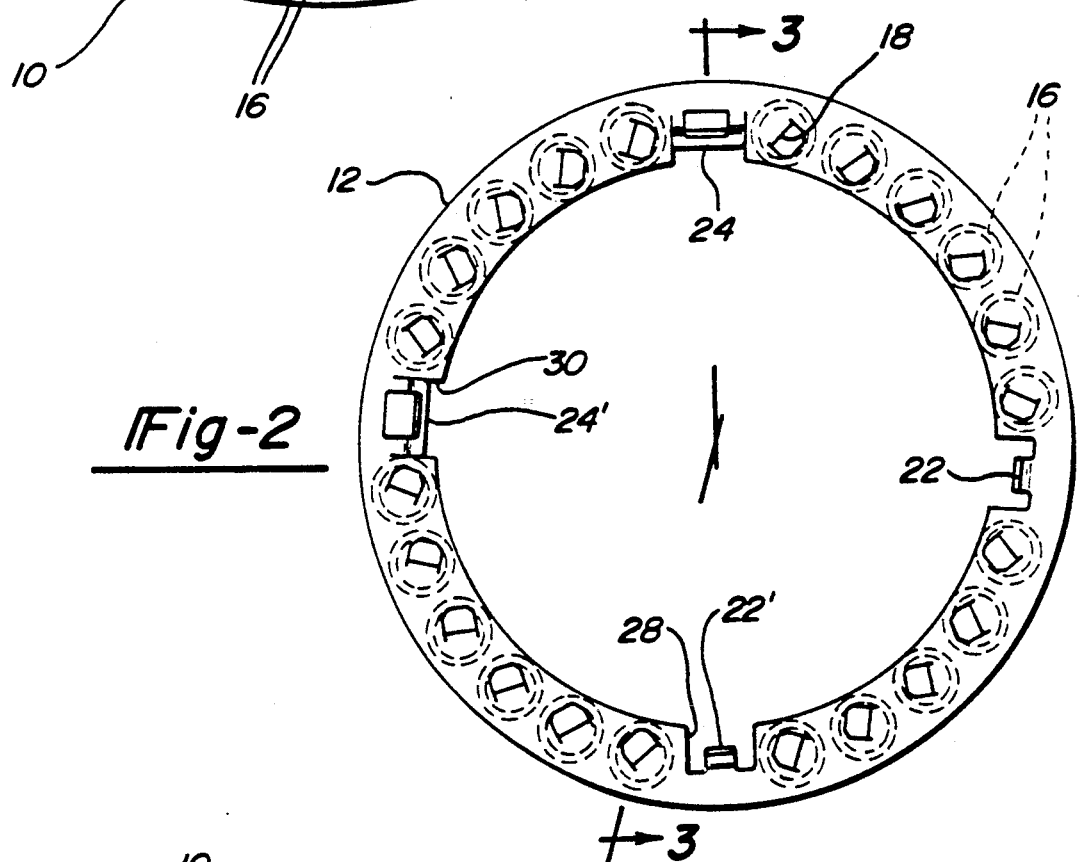
FIG. 2 is a plan view of the spring assembly shown in FIG. 1.

Referring to the drawings, the preferred embodiment of the assembly 10 according to the present invention is shown. The spring assembly 10 comprises a pair of opposed annular plates 12 nd 14 that are preferably made from stamped sheet metal, such as low carbon steel. Each of the annular plates 12 and 14 has an integral upstanding flange 15 formed around its outer periphery to strengthen and add rigidity to the annular flange. A plurality of integral upstanding tabs or guide pins 18 are formed by a stamping die from each of the annular plates 12 and 14 at circumferentially spaced locations around the annular plates. As best shown in FIG. 2, the tabs 18 are formed at an angle relative to a radial line intersecting each tab 18. Preferably, this angle of formation is approximately 45 degrees, although any angle between approximately 20 and 70 degrees is acceptable. The purpose of this configuration will be subsequently explained.

Figure 1:
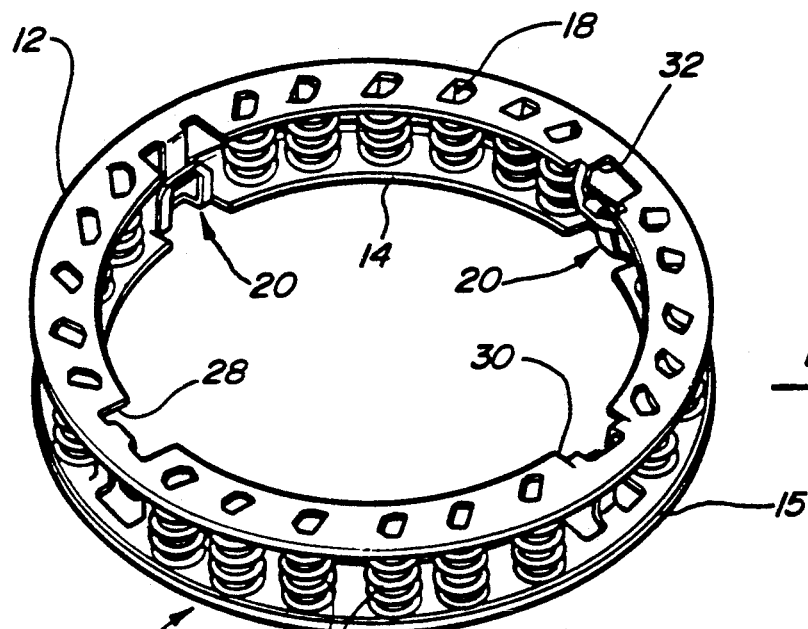
FIG. 1 is a perspective view of a spring assembly according to the present invention.
Figure 3:
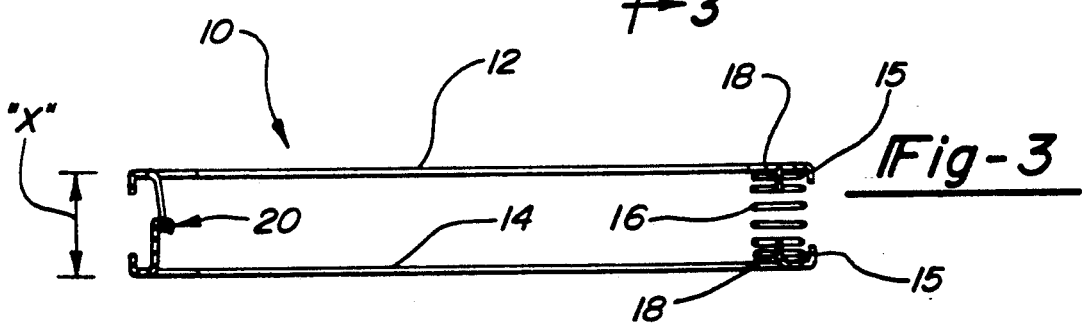
FIG. 3 is a sectional view of the spring assembly taken along line 3—3 in FIG. 2.

Mounted between the two annular plates 12 and 14 on the tabs or guide pins 18 is a corresponding plurality of compression springs 16. Preferably, the inside diameter of the compression springs 16 is approximately equal to the width of the guide pins 18 so that the ends of the compression springs can be press fit over the guide pins 18. In the preferred embodiment, the free height of the compression springs 16 is substantially greater than the assembled or "locked height" ("X" in FIG. 3) of the completed spring assembly 10. In other words, the springs 16 in the completed spring assembly 10 according to the present invention, as shown in FIGS. 1 and 3, are in a precompressed state.

Holding the springs in a precompressed state are means 20 interconnecting the upper annular plate 12 with the lower annular plate 14. In particular, the top annular plate 12 has integrally formed thereon at predetermined circumferentially spaced locations hook 22 and loop 24 members that are adapted to engage complementary loop 24 and hook 22 members integrally formed at corresponding circumferentially spaced locations on the lower annular plate 14. More specifically, and relative to FIG. 2, the upper annular plate 12 has a J-shaped hook member 22, 22' formed at approximately the 3 o'clock and 6 o'clock positions and a U-shaped loop member 24', 24 formed at approximately the 9 o'clock and 12 o'clock positions. In the preferred embodiment illustrated in the drawings there are five guide pins 18 and hence five compression springs 16 circumferentially spaced between the two hook members 22 and 22' and between the two loop members 24 and 24', and six guide pins 18 and hence six compression springs 16 circumferentially spaced between hook member 22 and loop member 24 and between hook member 22' and loop member 24'. Accordingly, the hook 22, 22' and loop members 24, 24' are not circumferentially spaced precisely 90 degrees apart. However, this relationship is not critical to the present invention.

However, critical to the preferred embodiment of the present invention is the fact that the circumferential spacing between the two loop members 22 and 22' is identical to the circumferential spacing between the two hook members 24 and 24', and that the circumferential spacing between adjacent hook 22 and loop members 24 is identical to the circumferential spacing between adjacent hook 22' and loop 24' members. In this manner, the upper annular plate 12 and lower annular plate 14 can be configured identically and therefore made from the same tooling. In particular, it will be appreciated that by taking two identically configured annular plates as described and inverting one of the plates and rotating it 180 degrees relative to the other annular plate, the hooks 22 and 22' of one annular plate 12 will align with the loops 24' and 24 of the other annular plate 14, and vice versa. Consequently, with the compression springs 16 properly positioned on the guide pins 18, the upper annular plate 12 is connected to the lower annular plate 14 by compressing the springs 16 between the two annular plates 12 and 14 and engaging the hook members 22 and 22' from one plate to the loop members 24' and 24 from the other plate. With the interconnection means 20 thus engaged, the completed spring assembly 10 assumes the assembled or "locked height" condition shown in FIG. 1.

Importantly, it will be noted that the interconnection means 20 in the present invention are configured so as not to preclude or otherwise limit in any way the compressible height of the overall spring assembly 10. With particular reference to FIGS. 5 and 6, the formation of the loop members 24 defines a central opening 32 that is wider than the width of the hook members 22. In addition, the stem portion of the hook member 22 is radially offset and oriented parallel to the plane of the hook member 24 (FIG. 6). Consequently, as the height of the spring assembly 10 is compressed, the hook members 22 are able to freely project into the central openings 32 of each corresponding loop member 24 as the transverse portion of each loop member 24 passes alongside the stem portion of its corresponding hook member 22.

Moreover, the height of both the hook members 22 and 22' and loop members 24 and 24' is less than the minimum compressible height "Y" of the spring assembly 10 (FIG. 4). Accordingly, under no condition are the hook or loop members permitted to protrude beyond the upper and lower annular plates 12 and 14.

Returning momentarily to FIGS. 1 and 2, it will additionally be noted that the width of the recesses 28 along the inner radial edge of the annular plate 12 defining the locations of the hook members 22 and 22' is equal to the width of the recesses 30 defining the locations of the loop members 24 and 24'. It will therefore be appreciated that the overall width of the loop members 24 is equal to the width of the recesses 28. Consequently, in order to ensure that the transverse portions of the loop members 24 do not contact the opposed annular plates adjacent the recesses 28 when the spring assembly 10 is fully compressed (FIG. 4), the corners 26 (FIG. 5) of the loop members 24 are chamfered to provide clearance between the side edges of the recesses 28 and the loop members 24.

Turning now to FIGS. 7 and 8, it will be recalled that the tabs or guide pins 18 of the annular plates 12 and 14 are formed at an offset angle so that when one of the two identically configured annular plates is flipped over relative to the other, the opposed guide pins 18 of the two annular plates 12 and 14 form a criss-cross pattern as shown in FIG. 7. In the preferred embodiment of the present invention, the height of the guide pins 18 is selected so that the guide pins 18 serve as a stop mechanism for limiting the compressibility of the spring assembly 10. In other words, as the two annular plates 12 and 14 are compressed together, the criss-cross orientation of the opposed guide pins 18 causes the guide pins to abut one another and thereby limit further compression of the spring assembly. Preferably, the height of the guide pins 18 is such that the minimum compressible height "Y" of the spring assembly 10 (FIG. 4) is slightly greater than the spring solid height of the spring assembly 10. In addition, it will further be noted that at the minimum compressible height "Y" shown in FIG. 4, neither of the hook or loop members 22 and 24 protrude beyond the outer surfaces of the upper 12 and lower 14 annular plates. Thus, it will be appreciated that the interconnecting means 20 in the present invention does not limit or effect in any way the compressibility of the spring assembly 10.

As noted above, the spring assembly 10 described in the preferred embodiment is intended for use in automatic transmissions for vehicles. In this application, it is desirable to configure the interconnecting means 20 so that locked height "X" of the spring assembly 10 is slightly greater than the maximum excursion height of the spring assembly during normal operation of the transmission. In this manner, the interconnecting means remains unloaded during operation of the transmission, thereby greatly improving the reliability of the spring assembly 10.

Finally, while the preferred embodiment of the present invention employs annular plates 12 and 14 that are made from stamped sheet metal, it will be appreciated that it is possible, depending on the requirements of a particular application, to injection mold the annular plates from various high strength plastic materials as well. The use of a plastic material may, of course, necessitate a modification to the design of the hook and loop members to accommodate the different material characteristics of the plastic selected. However, such modifications are believed to be well within the skill of those versed in this art.

While the above description constitutes the preferred embodiment of the invention, it will be appreciated that the invention is susceptible to modification, variation, and change without departing from the proper scope of fair meaning of the accompanying claims.

What is claimed is:

1. A spring assembly comprising:
    a pair of spaced-apart annular plates defining a central axis;
    a plurality of circumferentially spaced, parallel-oriented compression springs disposed between said annular plates and having associated therewith a free-state height; and
    interconnecting means external of said plurality of springs for joining said annular plates so that the maximum axial distance between said annular plates is limited to less than said free-state height of said springs to thereby precompress said springs, said interconnecting means being configured so as to permit the overall axial height of said spring assembly to diminish as said springs are compressed.

2. The spring assembly of claim 1 wherein said interconnecting means comprises first interconnecting means integrally formed on one of said annular plates and second interconnecting means integrally formed on the second of said annular plates.

3. The spring assembly of claim 2 wherein the configuration of said one annular plate with said first interconnecting means is identical to the configuration of said second annular plate with said second interconnecting means.

4. The spring assembly of claim 3 wherein said first and second interconnecting means on said one and second annular plates, respectively, each comprise hook means formed at first circumferentially spaced locations and loop means formed at second circumferentially spaced locations.

5. The spring assembly of claim 4 wherein said second annular plate is angularly offset relative to said one annular plate so that the hook means on said second annular plate are aligned with and adapted to engage the loop means on said one annular plate and the loop means on said second annular plate are aligned with and adapted to engage the hook means on said one annular plate.

6. The spring assembly of claim 2 wherein said first interconnecting means is adapted to hook onto said second interconnecting means.

7. The spring assembly of claim 2 wherein said one annular plate with said first interconnecting means and said second annular plate with said second interconnecting means are each comprised of a single piece of stamped sheet metal.

8. The spring assembly of claim 1 wherein each of said annular plates has formed thereon a corresponding plurality of circumferentially spaced tabs for mounting respective ends of said plurality of compression springs to said annular plates, such that each of said plurality of compression springs is mounted to a corresponding pair of opposed tabs on said pair of annular plates.

9. The spring assembly of claim 8 wherein said compression springs have associated therewith a minimum compression height, and further wherein the combined height of corresponding pairs of opposed tabs on said pair of annular plates is slightly greater than said minimum compression height so that said corresponding pairs of opposed tabs will abut one another to limit the compressibility of the spring assembly.

10. The spring assembly of claim 1 wherein said interconnecting means is disengaged when the spring assembly is compressed below said maximum axial distance.

11. The spring assembly of claim 10 wherein the spring assembly has associated therewith a maximum operative excursion height and further wherein said maximum operative excursion height is less than said maximum axial distance so that said interconnection means is normally disengaged during use of the spring assembly.

12. A spring assembly comprising:
    a pair of spaced-apart annular plates defining a central axis, one of said annular plates having integrally formed thereto first interconnecting means at circumferentially spaced locations thereon, and the second of said annular plates having integrally formed thereto second interconnecting means at circumferentially spaced locations thereon; and
    a plurality of circumferentially spaced, parallel-oriented compression springs disposed between said annular plates and having associated therewith a free-state height;
    said first interconnecting means being adapted to engage said second interconnecting means so as to limit the maximum axial distance between said annular plates to less than said free-state height of said springs to thereby precompress said springs;
    the configuration of said one annular plate with said first interconnecting mean's being identical to the configuration of said second annular plate with said second interconnecting means.

13. The spring assembly of claim 12 wherein each of said pair of annular plates has formed thereon a corresponding plurality of circumferentially spaced tabs for mounting respective ends of said plurality of compression springs.

14. The spring assembly of claim 13 wherein each of said tabs is formed at an angle relative to a radial line intersecting said tab.

15. The spring assembly of claim 14 wherein said compression springs have associated therewith a minimum compression height, and further wherein the combined height of corresponding pairs of opposed tabs on said pair of annular plates is slightly greater than said minimum compression height so that corresponding pairs of opposed tabs will abut one another to limit the compressibility of the spring assembly.

16. The spring assembly of claim 12 wherein said first and second interconnecting means permit the overall axial height of said spring assembly to diminish as said springs are compressed.

17. The spring assembly of claim 16 wherein said first and second interconnecting means are disengaged when said spring assembly is compressed below said maximum axial distance.

18. The spring assembly of claim 17 wherein the spring assembly has associated therewith a maximum operative excursion height and further wherein said maximum operative excursion height is less than said maximum axial distance so that said first and second interconnection means are normally disengaged during use of the spring assembly.

19. The spring assembly of claim 17 wherein said first and second interconnecting means each comprises a pair of hook means projecting from its respective annular plate substantially parallel to said axis and spaced apart a predetermined circumferential distance, and a pair of loop means projecting from said respective annular plate substantially parallel to said axis and spaced apart said predetermined circumferential distance.

20. The spring assembly of claim 19 wherein the spring assembly has associated therewith a predetermined minimum compressible height and further wherein the axial height of said hook means and said loop means is less than said predetermined minimum compressible height.

21. A spring assembly comprising:
first and second spaced-apart annular plates defining a central axis; and
a plurality of circumferentially spaced, parallel-oriented compression springs disposed between said annular plates and having associated therewith a free-state height;
said first and second annular plates having integrally formed thereon first and second interconnecting means, respectively, for joining said annular plates so that the maximum axial distance between said annular plates is limited to less than said free-state height of said springs to thereby precompress said springs, said first and second interconnecting means each comprising hook means formed at first circumferentially spaced locations and loop means formed at second circumferentially spaced locations so as to permit the overall axial height of said spring assembly to diminish as said springs are compressed;
whereby the configuration of said first annular plate with said first interconnecting means is identical to the configuration of said second annular plate with said second interconnecting means.

22. The spring assembly of claim 21 wherein said second annular plate is angularly offset relative to said first annular plate so that the hook means on said second annular plate are aligned with and adapted to engage the loop means on said first annular plate and the loop means on said second annular plate are aligned with and adapted to engage the hook means on said first annular plate.

23. A spring assembly comprising:
a pair of spaced-apart annular plates defining a central axis, one of said annular plates having integrally formed thereto first interconnecting means at circumferenitally spaced locations thereon, and the second of said annular plates having integrally formed thereto second interconnecting means at circumferentially spaced locations thereon; and
a plurality of circumferentially spaced, parallel-oriented compression springs disposed between said annular plates circumferentially spaced apart from said first and second interconnecting means and having associated therewith a free-state height;
said first interconnecting means being adapted to engage said second interconnecting means so as to limit the maximum axial distance between said annular plates to less than said free-state height of said springs to thereby precompress said springs;
said first and second interconnecting means being configured so as to permit the overall axial height of said spring assembly to diminish as said springs are compressed.

24. The spring assembly of claim 23 wherein the configuration of said one annular plate with said first interconnecting means is identical to the configuration of said second annular plate with said second interconnection means.

25. The spring assembly of claim 23 wherein each of said pair of annular plates has formed thereon a corresponding plurality of circumferentially spaced tabs for mounting respective ends of said plurality of compression springs.

26. The spring assembly of claim 25 wherein each of said tabs is formed at an angle relative to a radial line intersecting said tab.

27. The spring assembly of claim 26 wherein said compression springs have associated therewith a minimum compression height, and further wherein the combined height of corresponding pairs of opposed tabs on said pair of annular plates is slightly greater than said minimum compression height so that said corresponding pairs of opposed tabs will abut one another to limit the compressibility of the spring assembly.

28. The spring assembly of claim 23 wherein said first and second interconnecting means each comprises a pair of hook means projection from its respective annular plate substantially parallel to said axis and spaced apart a predetermined circumferential distance, and a pair of loop means projecting form said respective annular plate substantially parallel to said axis and spaced apart said predetermined circumferential distance.

29. The spring assembly of claim 28 wherein the spring assembly has associated therewith a predetermined minimum compressible height and further wherein the axial height of said hook means and said loop means is less than said predetermined minimum compressible height.

30. The spring assembly of claim 23 wherein said one annular plate with said first interconnecting means and said second annular plate with said second interconnecting means each comprise a single stamped sheet metal part.

* * * * *